United States Patent [19]

Weems et al.

[11] Patent Number: 5,600,690
[45] Date of Patent: Feb. 4, 1997

[54] METHOD AND APPARATUS FOR REPAIRING BOILING WATER REACTOR SHROUDS UTILIZING TIE-RODS AND BRACES

[75] Inventors: Sterling J. Weems, Chevy Chase, Md.; Noman Cole, Mason Neck, Va.

[73] Assignee: MPR Associates, Inc., Alexandria, Va.

[21] Appl. No.: 359,376

[22] Filed: Dec. 20, 1994

Related U.S. Application Data

[63] Continuation-in-part of Ser. No. 190,796, Feb. 2, 1994, Pat. No. 5,402,570, and Ser. No. 332,815, Oct. 31, 1994, abandoned.

[51] Int. Cl.$^6$ .............................. G21C 11/00; G21C 5/10
[52] U.S. Cl. ............................................ 376/302; 376/285
[58] Field of Search ................................... 376/260, 285, 376/287, 302, 303, 304, 461

[56] References Cited

U.S. PATENT DOCUMENTS

| | | | |
|---|---|---|---|
| 2,929,236 | 3/1960 | Steward et al. | 52/223.3 |
| 3,011,962 | 12/1961 | Koch et al. | 376/302 |
| 3,116,214 | 12/1963 | Greenstreet | 376/304 |
| 3,215,608 | 11/1965 | Guenther . | |
| 3,445,971 | 5/1969 | Desmarchais et al. | 371/294 |
| 3,627,634 | 12/1971 | Guenther et al. | 376/303 |
| 3,719,555 | 3/1973 | Davis | 376/341 |
| 3,720,581 | 3/1973 | Kaser | 376/287 |
| 3,733,760 | 5/1973 | Koerner | 376/296 |

(List continued on next page.)

FOREIGN PATENT DOCUMENTS

| | | |
|---|---|---|
| 2107382 | 4/1972 | France . |
| 1958152 | 11/1970 | Germany . |
| 2024630 | 1/1971 | Germany . |
| 2361416 | 4/1975 | Germany . |
| 2643011 | 3/1978 | Germany . |
| 257958 | 7/1988 | Germany . |
| 1787095 | 1/1993 | U.S.S.R. . |
| 1271594 | 4/1972 | United Kingdom ............. 376/302 |

OTHER PUBLICATIONS

J. S. Abel et al, "Applicability of Pipelocks as a Remedy for Intergranular Stress Corrosion Cracking in BWRs," Int. J. Pres. Ves. & Piping 25, pp. 25–466 (1986).

J. S. Abel et al, "Mechanical Methods of Improving Resistance to Stress Corrosion Cracking in BWR Piping Systems," Int. J. Pres. Ves. & Piping 34, pp. 17–29 (1988).

Consumers Power Company, "Report of Operation of Big Rock Point Nuclear Plant," Docket No. 50–155, Forty Pages (Nov. 30, 1964).

Consumers Power Company, "Report of Operation of Big Rock Nuclear Plant," Docket No. 50–155, Six Pages (Dec. 30, 1965).

J. E. Corr, "Big Rock Point Nuclear Plant Thermal Shield Instability, Part 1, Redesign and Test Programs," General Electric, San Jose, California, Seventy–Three Pages (Nov. 3, 1966).

*Primary Examiner*—Daniel D. Wasil

[57] ABSTRACT

A method and apparatus for repairing nuclear reactor core shrouds having horizontal cracks in heat affected zones of welds joining a horizontal plate to upper and lower cylindrical sections of the shroud includes securing a plurality of braces between an upper shroud flange and a top surface of the horizontal plate near an inner edge of the plate. The braces are installed at a respective plurality of angularly spaced locations within the upper cylindrical section of the shroud and each have an upper notched end for bearing against a bottom edge of the flange and a lower notched end for bearing against the top surface of the horizontal plate and/or an outer peripheral edge of an upper core grid structure mounted on the top surface of the plate. The upper portion of each brace can be clamped to a tubular core sparger disposed within the upper cylindrical section and can be held in compression between the shroud flange and the upper core grid structure, or the horizontal plate directly, with a jacking bolt threadedly engaging the brace and having a lower end bearing against the upper core grid structure or the horizontal plate.

16 Claims, 6 Drawing Sheets

U.S. PATENT DOCUMENTS

| | | | |
|---|---|---|---|
| 3,744,660 | 7/1973 | Gaines et al. | 376/294 |
| 3,785,924 | 1/1974 | Notari | 376/287 |
| 3,850,795 | 11/1974 | Thome . | |
| 3,910,447 | 10/1975 | Bevilacqua | 376/294 |
| 3,926,722 | 12/1975 | Dupen | 376/287 |
| 3,994,776 | 11/1976 | Keller . | |
| 4,011,132 | 3/1977 | Kumpf et al. . | |
| 4,053,080 | 10/1977 | Daublebsky . | |
| 4,057,162 | 11/1977 | Gross | 376/294 |
| 4,073,685 | 2/1978 | Brown et al. . | |
| 4,092,215 | 5/1978 | Mutzl . | |
| 4,111,327 | 9/1978 | Janakiev | 376/294 |
| 4,165,021 | 8/1979 | Dorling . | |
| 4,192,718 | 3/1980 | Janakiev | 376/294 |
| 4,199,403 | 4/1980 | Puri et al. . | |
| 4,199,994 | 4/1980 | Beine et al. | 376/249 |
| 4,223,797 | 9/1980 | Skakunov | 220/565 |
| 4,265,010 | 5/1981 | Doss et al. | 376/261 |
| 4,285,503 | 8/1981 | Calhoun et al. | 29/890.031 |
| 4,299,658 | 11/1981 | Meuschke et al. | 376/260 |
| 4,322,880 | 4/1982 | Lampe . | |
| 4,379,119 | 4/1983 | Fujimoto . | |
| 4,409,179 | 10/1983 | Burger . | |
| 4,562,332 | 12/1985 | Walter et al. | 29/402.01 |
| 4,585,091 | 4/1986 | Budd | 29/402.15 |
| 4,596,689 | 6/1986 | Gorholt et al. . | |
| 4,652,426 | 3/1987 | Boyle et al. | 376/352 |
| 4,789,520 | 12/1988 | Morimoto et al. | 376/428 |
| 5,274,683 | 12/1993 | Broda et al. | 376/260 |
| 5,319,692 | 6/1994 | Hopkins et al. . | |
| 5,392,322 | 2/1995 | Whitling et al. | 376/302 |
| 5,430,779 | 7/1995 | Baversten et al. . | |

OTHER PUBLICATIONS

BWR Owner's Group, "Recommendations on Inservice Inspection of BWR Internal Components and Attachments," Presented to ASME Section XI Subcommittee on Nuclear Inservice Inspection, 29 pgs. (Apr. 1991).

Baltimore Gas and Electric, "Updated Final Safety Analysis Report –Calvert Cliffs Nuclear Power Plant," Forty–Five Pages (Jul. 20, 1982).

Illustrations of Haddam Neck Nuclear Plant, FIGS. 5.3–4 and 04.2–10 (Mar. 1991 and Jun. 1994).

Illustrations of Hatch Nuclear Plant, FIG. 3.3–1, FIG. 4.1–1, FIG. 4.2–9 and FIG. 4.1–4.

Kewaunee Reactor Vessel Schematic, FIG. 3.2–21 and FIG. 4.2–2, Three Pages (Jul. 1, 1986).

Letter from Nuclear Regulatory Commission to Hatch dated Sep. 30, 1994, Thirteen Pages.

Hatch Submittal to Nuclear Regulatory Commission dated Sep. 2, 1994, Nineteen Pages.

Illustration of Indian Point Unit 2, FIGS. 2–1, 2–9, 3.2–47 and 3.2–51, Six Pages.

Illustration of Maine Yankee Atomic Power Station, FIG. 3.3–1, One Page.

U.S. Nuclear Regulatory Commission, "Millstone Final Safety Analysis Report," Aug. 10, 1972, 54 Pages.

Handouts from NRC Meeting with Hatch/GE on Sep. 14, 1994, 211 pages.

Illustration of Palo Verde Reactor Vertical Arrangement, FIG. 4.1–1, Mar. 1991, One page.

Illustration of R. E. Ginna Reactor Vessel Internals, FIG. 3.9–9 and 3.9–10, Two pages.

Florida Power & Light Company, "Final Safety Analysis Report –vol. 1, St. Lucie Plant," Feb. 28, 1973, Eighty–four Pages.

Illustration from Shearon Harris Nuclear Power Plant, Carolina Power & Light Company, Final Safety Analysis Report, FIG. 3.9.2–1, Two Pages.

Yankee Atomic Electric Company, Yankee Rowe Proposal, Oct. 15, 1965, Twenty–Five Pages.

METHOD AND APPARATUS FOR REPAIRING BOILING WATER REACTOR SHROUDS UTILIZING TIE-RODS AND BRACES

CROSS-REFERENCE TO RELATED APPLICATIONS

This application is a continuation-in-part of patent applications Ser. No. 08/190,796, filed Feb. 2, 1994, now U.S. Pat. No. 5,402,570, and Ser. No. 08/332,815, filed Oct. 31, 1994, now abandoned the disclosures of which are incorporated herein by reference.

BACKGROUND OF THE INVENTION

1. Technical Field

The present invention relates to a method and apparatus for repairing nuclear reactor core shrouds. In particular, the method and apparatus of the present invention are concerned with repair of boiling water reactor shrouds in order to allow safe reactor operation even with extensive cracking along heat affected zones of horizontal welds joining orthogonal shroud plate segments.

2. Discussion of the Prior Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are commonly formed from multiple arcuate steel plates. Plates at each horizontal level of a shroud are joined by welds along abutting, relatively short, vertical edges to form cylindrical segments at respective horizontal levels. Cylindrical segments of the same diameter at adjacent lower levels surround the core region and are joined along their abutting, relatively long, arcuate edges with horizontal welds to form a lower cylindrical section. A horizontal plate shaped like a ring extends radially outward from the top edge of the lower cylindrical section surrounding the core to the bottom edge of an upper cylindrical section of increased diameter to serve as a shoulder or rim for supporting an upper core grid. The horizontal plate can be formed as a single piece or constructed from multiple arcuate pieces welded together to form a ring. Inner and outer circumferential edges of the horizontal plate are joined to the lower and upper cylindrical sections with horizontal welds extending along the entire periphery or circumference of the shroud. An internal flange extends horizontally between the bottom edge of the lower cylindrical section and the top edge of a cylindrical base of diminished diameter to support a core support plate.

After periods of use, cracking of the shroud tends to occur within heat affected zones of the welds as a result of corrosion, radiation and stress. Cracking of the vertically oriented welds is considered acceptable because these welds are relatively short in length, relative to the overall shroud length, and do not adversely affect the function of the shroud (i.e., support and alignment of the nuclear fuel assemblies, and channeling of reactor coolant flow). Specifically, vertical welds at adjacent levels are offset angularly about the shroud periphery so that cracking of such a weld can extend, at most, only the axial or vertical length of that level. However, if cracking occurs along the longer horizontal or circumferential welds, a crack can extend along the entire circumference or periphery of the shroud, permitting relative lateral movement between the plate levels and vertical deflection of the horizontal plate supporting the upper core grid. If, in addition, cracking occurs along radial welds used to join arcuate pieces of the horizontal plate such that the pieces of the horizontal plate can move relative to one another, the structural support needed to position and align the steam separator assembly can be compromised.

More specifically, failure of the welds joining the horizontal plate to respective upper and lower cylindrical sections of the shroud can cause a significant downward deflection of the outer edge of the horizontal plate preventing the upper cylindrical section from adequately supporting the steam separator assembly of the boiling water reactor. In a case where radial welds join pieces of the horizontal plate together, failure of the radial welds joining the horizontal plate pieces can cause even more serious downward deflection of the steam separator assembly. Alternatively or in addition to the downward deflection of the outer edge of the plate, upward deflection of the inner edge of the plate can occur when the lower cylindrical section moves vertically in response to differential pressures across the core support plate as a result of a horizontal crack developing below the core support plate and failure of the horizontal welds joining the horizontal plate to the upper and lower cylindrical sections and/or failure of any radial welds joining horizontal plate pieces. If welds joining segments of the cylindrical base and/or lower cylindrical sections are cracked below the core support plate region, vertical movement of those sections above the crack will promote separation of the cylindrical shroud sections and permit reactor coolant to bypass the core region by flowing through the separations between cylindrical sections of the shroud.

When excessive horizontal and/or radial weld cracking occurs, the shroud must either be replaced or repaired. Repair is certainly the preferred alternative in view of the fact that replacement involves significant expense, relatively long shut-down time, and the potential for radiation exposure to personnel. Repair techniques typically involve bolting brackets onto vertically adjacent plates across a weld crack. This approach requires plural brackets for each crack, depending upon the length of the crack, and is not well suited for repairing cracks and welds joining orthogonal plate segments. Moreover, bolted brackets covering cracks in the weld area of the horizontal plate would require remote cutting and high clamping forces to be held in place.

A superior method for repairing in situ nuclear reactor shrouds of the type having multiple levels of arcuate plates welded together is disclosed in related copending application Ser. No. 08/190,796. The method involves inspecting the shroud for horizontal cracking along welds and securing plural tie-rods in vertical orientation spaced about the periphery of the cracked shroud to axially compress the shroud and thereby urge the opposing surfaces of the horizontal crack toward one another. The repair method and apparatus of the present invention can be used alone or together with the tie-rods of the aforementioned repair method to permit safe reactor operation even with excessive cracking of the horizontal welds joining the horizontal plate to upper and lower cylindrical sections of the shroud. Also, by use of the repair method and apparatus of the present invention, loads and stresses on the horizontal plate are decreased thereby reducing the tendency of the horizontal and/or radial welds of the plate to crack irrespective of whether the method and apparatus are used alone or together with tie-rods.

OBJECTS AND SUMMARY OF THE INVENTION

It is therefore an object of the present invention to prevent excessive vertical deflection of a horizontal plate joining upper and lower vertical shroud plate sections in a boiling water reactor shroud by securing a plurality of braces in compression between the upper and lower vertical shroud plate sections at a respective plurality of angularly spaced locations about the shroud.

It is an additional object of the present invention to stabilize a horizontal plate joining upper and lower vertical shroud plate sections of a boiling water reactor in the event of cracking along radial welds joining pieces of the horizontal plate by securing a plurality of braces in compression between the upper and lower vertical shroud plate sections at a respective plurality of angularly spaced locations about the shroud.

It is another object of the present invention to secure the braces between the upper section of the shroud and the horizontal plate or a structure, such as an upper core grid, mounted on the horizontal plate.

It is also an object of the present invention to position a lower notched end of each brace against a peripheral edge of the upper core grid and an upper notched end of each brace against a top flange of the shroud upper section to transmit loads between upper and lower sections of the shroud.

A further object of the present invention is to hold each brace in compression between the top flange of the shroud upper section and the upper core grid by selectively increasing the vertical dimension of a member extending between the brace and the upper core grid.

In accordance with the present invention, a method for repairing a boiling water reactor shroud of the type having welds joining a horizontal shroud plate with upper and lower vertical shroud plate sections involves securing a plurality of braces in compression between the upper vertical shroud plate section and the lower vertical shroud plate section at a respective plurality of angularly spaced locations about the shroud.

Another aspect of the present invention is generally characterized in a boiling water reactor shroud assembly having a boiling water reactor shroud with upper and lower vertical shroud plate sections joined by a horizontal plate and a plurality of braces held in compression between the upper and lower vertical shroud plate sections at a respective plurality of angularly spaced locations about the shroud.

The foregoing and other objects, features and many of the attendant advantages of the present invention will be appreciated more readily as they become better understood from reading the following description considered in connection with the accompanying drawings wherein like parts in each of the several figures are identified by the same reference characters.

DESCRIPTION OF THE PREFERRED EMBODIMENTS

Figure 1:
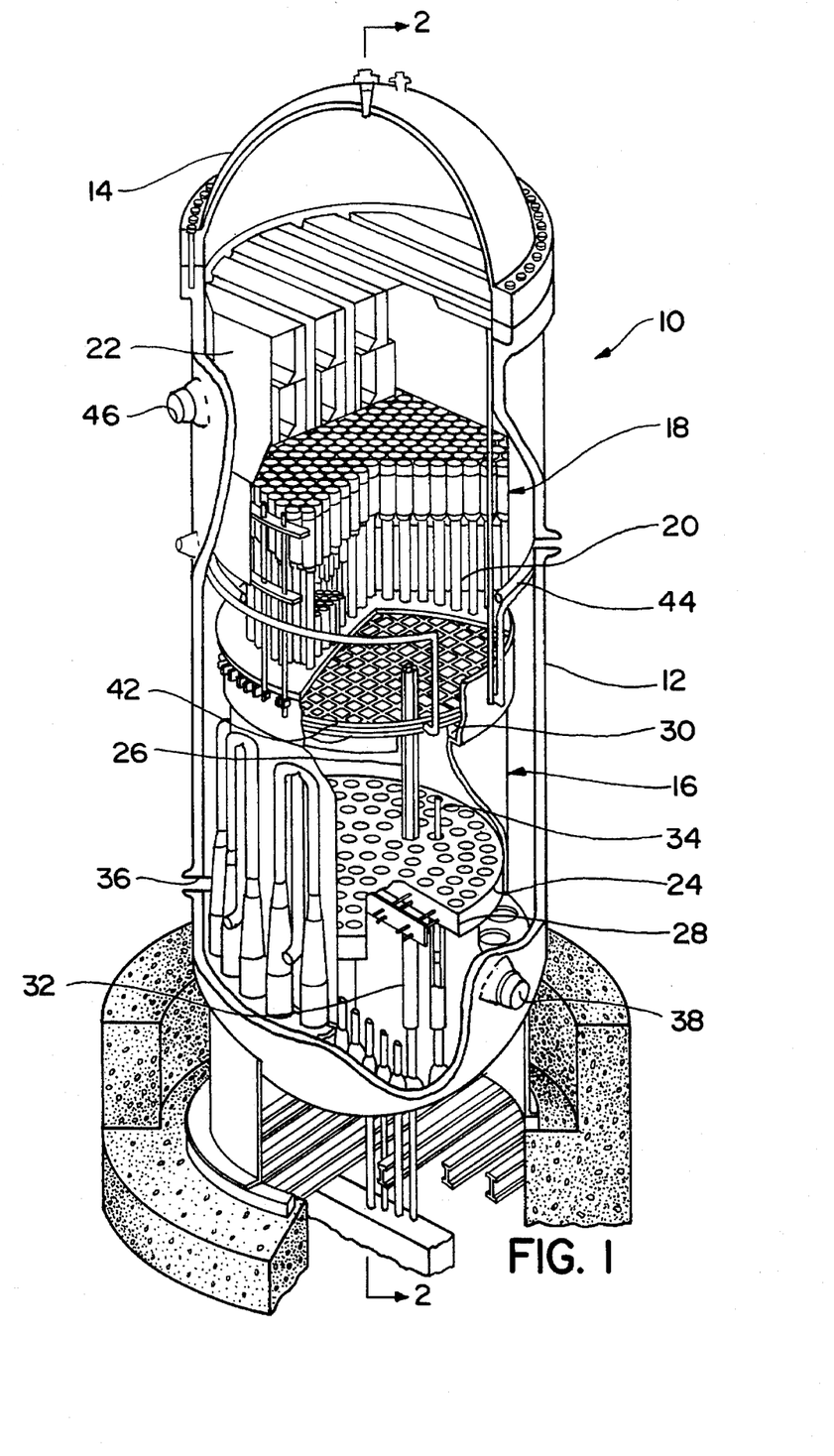
FIG. 1 is a cut-away view in perspective of a boiling water reactor exemplifying a type of reactor suitable for repair by the method of the present invention.

In order to provide a point of reference for understanding the method and apparatus of the present invention, a boiling water nuclear reactor assembly 10 is illustrated in cut away in FIG. 1. In view of the fact that the invention relates primarily to improvements in the reactor shroud and not to the reactor itself, no attempt is made herein to provide a detailed description of reactor operation. Such operation is adequately described in numerous publications and patents, for example, U.S. Pat. Nos. 3,627,634 (Guenther et al) and 4,789,520 (Morimoto et al), among others.

Reactor assembly 10 includes a pressure vessel 12 tightly sealed by a reactor vessel head or lid 14 at the vessel top. Reactor core shroud 16 is mounted inside vessel 12. A steam separator assembly 18 is mounted on a steam plenum head 20 on top of the shroud 16, and a steam drying assembly 22 is disposed above the steam separator. A lower reactor core support plate 24 disposed within shroud 16 supports a fuel assembly 26, also disposed within the shroud. Lower core grid 28 and upper core grid 30 are positioned below and above, respectively, fuel assembly 26.

Control rod guide tubes 32 are provided within vessel 12 at locations above a control rod driving mechanism (not shown) located at the bottom of the vessel beneath shroud 16. The lower ends of corresponding control rods 34 are detachably connected to the driving mechanism and are arranged to move up and down within guide tubes 32.

Recirculated water is delivered into vessel 12 by one or more inlet ports 36, and egresses via one or more outlet ports 38. Also illustrated is a core spray sparger 42 and a feedwater sparger 44. One or more steam outlets 46 communicates between the interior and exterior of vessel 12 at a location above the shroud and the steam separator.

Figure 2:
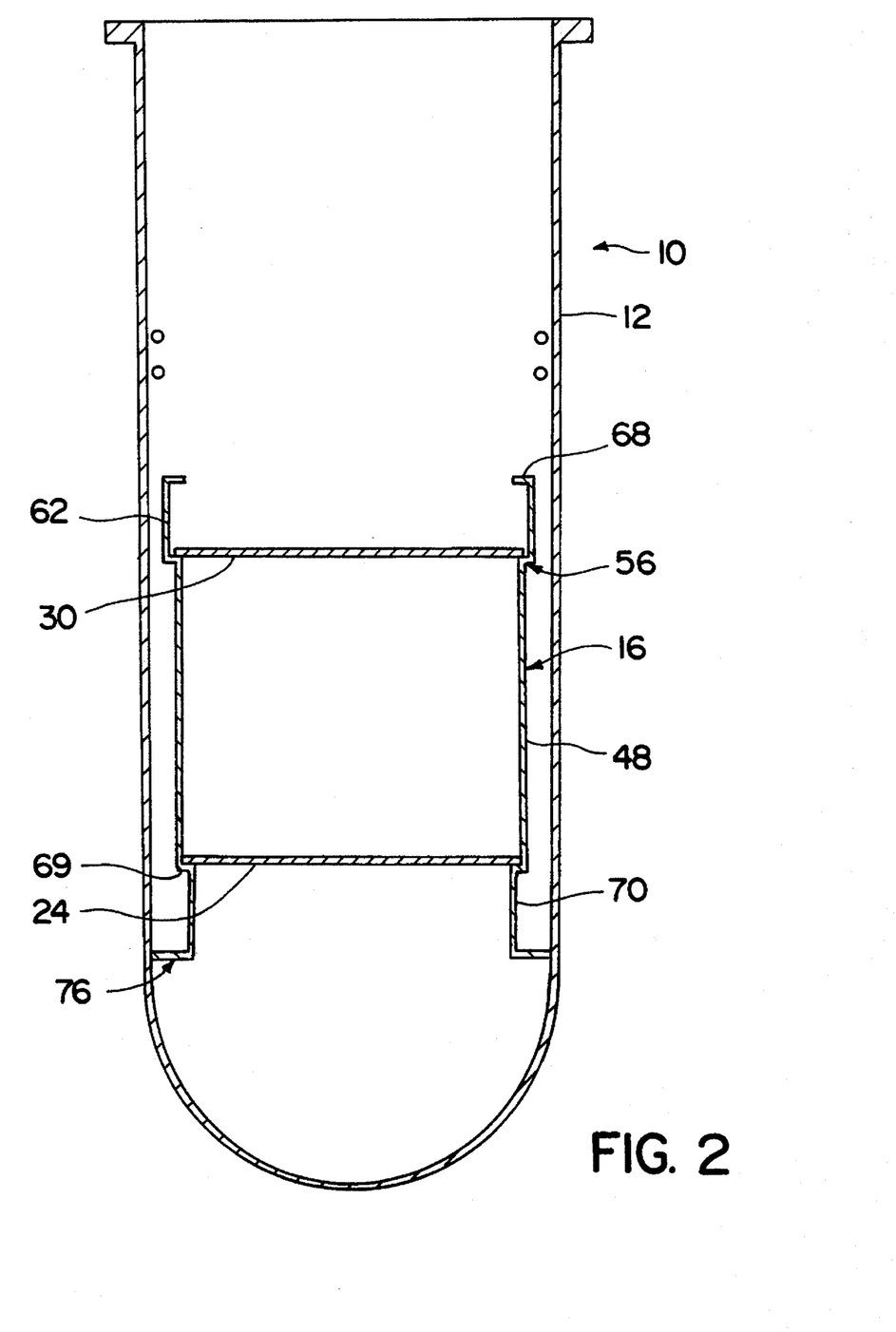
FIG. 2 is a simplified cross-sectional view of the reactor of FIG. 1.
Figure 3:
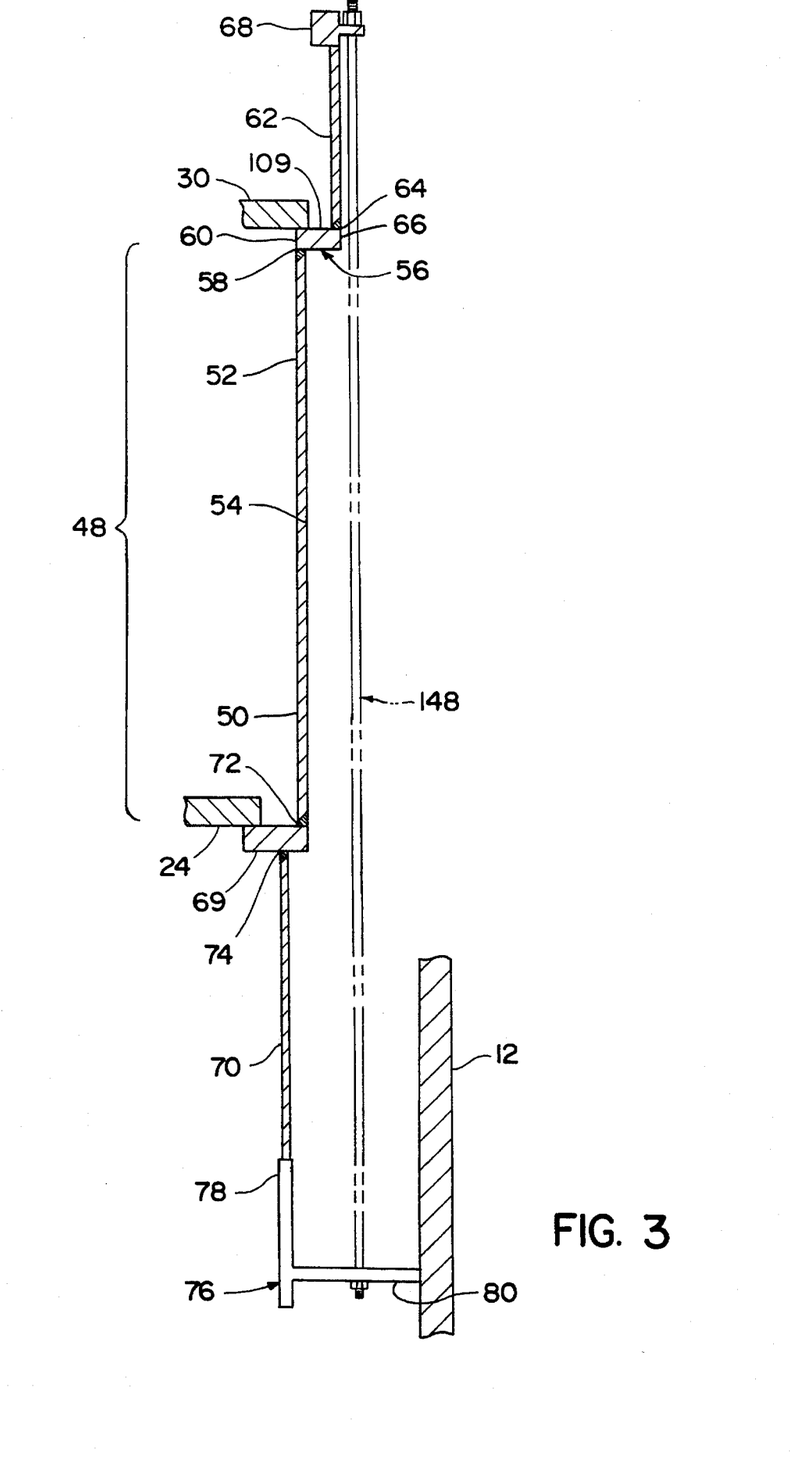
FIG. 3 is a detailed view in longitudinal section of a portion of a reactor shroud.

Shroud 16 is typically made up of multiple levels, each comprising plural arcuate Type 304 stainless steel plates welded together along abutting vertical edges to form cylindrical segments. Adjacent cylindrical segments of the same diameter can be arranged in vertical orientation and joined along abutting horizontal edges by continuous circumferential welds to form longer cylindrical units or sections. As best seen in FIGS. 2 and 3, shroud 16 includes three cylindrical sections of varying diameter. The lower cylindrical section 48 encircles the reactor core and is typically made up of two levels of cylindrical segments 50 and 52 joined along abutting horizontal edges by a continuous circumferential weld 54 to form a single cylindrical section.

A horizontal plate 56 is configured as a ring and is attached to the upper edge of the lower cylindrical section 48 by a continuous horizontal weld 58 joining the inner edge 60 of the ring and the upper edge of the lower cylindrical section 48. The horizontal plate 56 forms a rim extending radially outward from the upper edge of the lower cylindrical section 48 for supporting the upper core grid 30. An outer edge 66 of the plate connects with the bottom edge of an upper cylindrical section 62 and is joined thereto by a continuous horizontal weld 64. The particular upper cylindrical section 62 shown is formed by a single level of arcuate plates welded together along abutting vertical edges. An inwardly extending annular flange 68 is affixed to an upper edge of the upper cylindrical section 62 and provides a mounting surface for attaching the shroud head and steam separator assembly to the reactor shroud.

Core support plate 24 is disposed within the central cylindrical section 48 atop an inwardly extending horizontal flange 69 welded between the bottom edge of the lower cylindrical section 48 and a cylindrical base section 70 of diminished diameter. Welds 72 and 74 joining the lower cylindrical section 48 and base 70 to the core support flange 69 extend continuously along opposite horizontal surfaces of the flange 69. A circular shroud support 76 includes a cylindrical portion 78 extending downward from a bottom edge of the cylindrical base 70 and a horizontal ring 80 extending perpendicularly from the cylindrical portion of the support for attachment to the reactor vessel wall 12. The shroud support 76 is typically fabricated of Inconel 600 and welded to the bottom edge of the cylindrical base 70 using an appropriate weld metal for mating Type 304 stainless steel to Inconel 600.

No vertical welds in any shroud level or cylindrical segment are aligned with vertical welds in an adjacent cylindrical segment. Accordingly, a crack in a heat affected zone of any vertical weld cannot extend beyond one cylindrical segment, and such cracks are typically ignored. On the other hand, horizontal welds 54, 58, 64, 72 and 74 are circumferentially continuous. A crack in the heat affected zone in one of these horizontal welds, therefore, could ultimately extend about the entire circumference of the shroud. It will be appreciated that circumferential cracks could result in significant relative horizontal movement between shroud levels in response to seismic events and other vibrations. Also, weakening of the welds 58 and 64 joining the horizontal plate 56 to lower and upper cylindrical sections 48 and 62, respectively, could result in significant relative vertical movement between shroud levels as a consequence of the horizontal plate 56 tilting or deflecting in a vertical direction. Horizontal and/or vertical movement between shroud levels would adversely affect the support and alignment of nuclear fuel assemblies disposed within the shroud and the flow of reactor coolant through the reactor.

The method of the present invention can be performed prior to or subsequent any indication of cracking in the heat affected zones of horizontal welds 58 or 64 joining the horizontal plate 56 with the lower and upper cylindrical sections 48 and 62. For example, if horizontal cracking is noticed during a periodic inspection of the shroud, the shroud can be repaired in the manner described below. The method of the present invention involves installing braces in situ during installation of a new reactor or, in the case of an already operational reactor, while the reactor is shut down. Installation of the braces uses existing structure in the reactor whenever possible but may require additional hardware. The braces are spaced about the circumference of the shroud within the upper cylindrical section of the shroud.

The features of the shroud assembly are typically the same at a plurality of angularly spaced locations about the shroud periphery where the braces are installed. Accordingly, the shroud assembly will hereinafter be described with reference to a single angular location for purposes of clarity.

Figure 4:
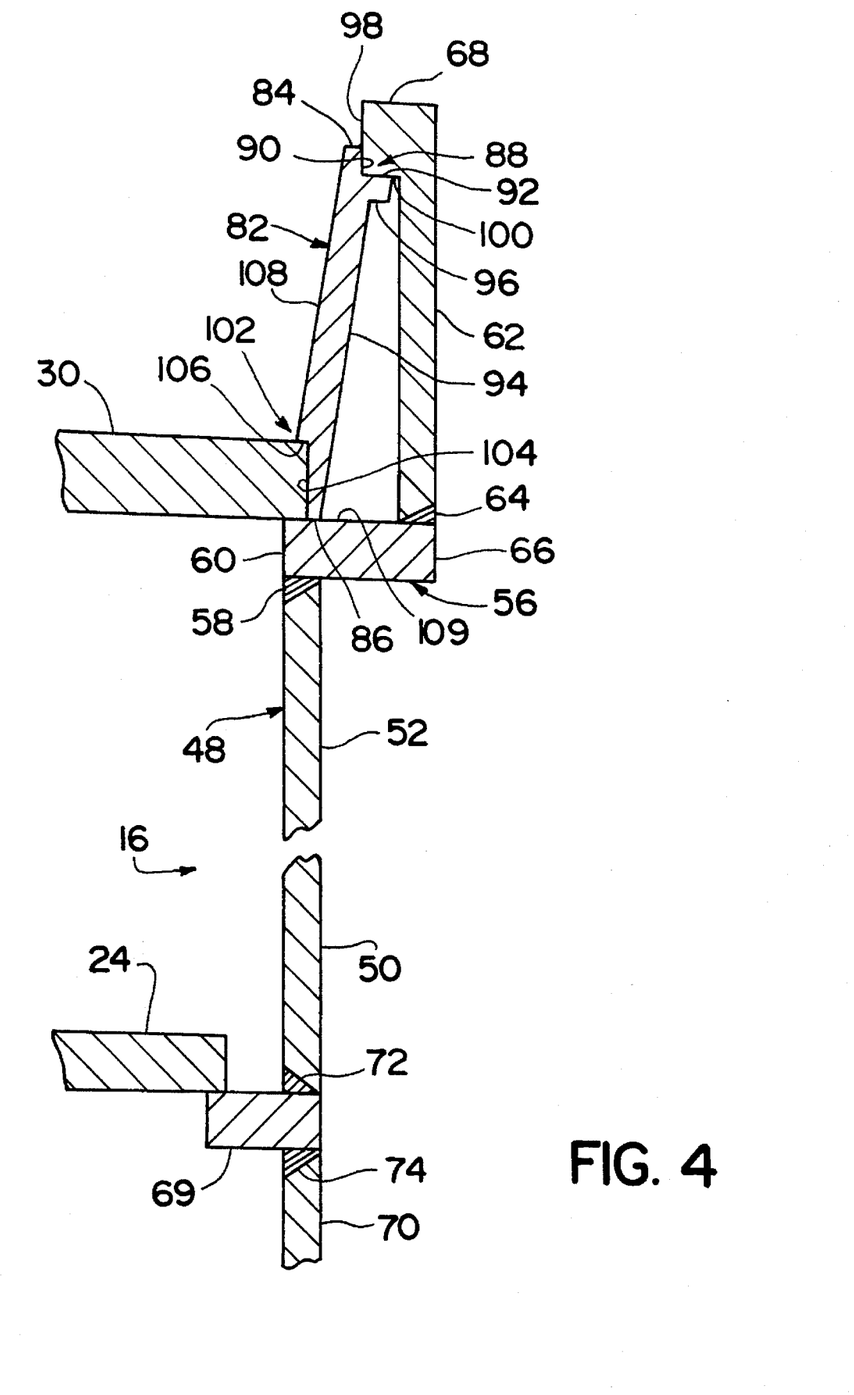
FIG. 4 is a detailed view in longitudinal section of a portion of a reactor shroud repaired according to the present invention.

A shroud structure and brace assembly is shown schematically in FIG. 4. As described previously, shroud 16 includes a lower cylindrical section 48 and a horizontal plate 56 extending perpendicularly from an upper edge of the lower cylindrical section 48 to join with a bottom edge of an upper cylindrical section 62. Upper core grid 30 is horizontally supported along a peripheral edge by horizontal plate 56 and exerts a downward force on the horizontal plate 56 and the lower cylindrical section 48. Lower core support plate 24 is horizontally supported near a bottom edge of the lower cylindrical section 48 by an inwardly extending flange 69 extending perpendicularly from the bottom edge of the lower cylindrical section 48. Horizontal plate 56 is joined with upper cylindrical section 62 by a continuous horizontal weld 64. Continuous horizontal weld 58 joins the inner edge of the horizontal plate 56 to the upper edge of the lower cylindrical section 48. Continuous horizontal welds 72 and 74 join the opposite sides of the core support flange 69 to lower and cylindrical base sections 48 and 70, respectively. Upper shroud flange 68 extends radially inward from the top edge of the upper cylindrical section 62.

Braces 82 are installed to extend diagonally between the upper shroud flange 68 and the peripheral edge of the upper core grid 30. Each brace 82 is a flat elongate bar having upper and lower ends 84 and 86 notched to fit snugly against the upper shroud flange 68 and the upper core grid 30. Upper notch 88 includes a vertical abutment surface 90 oriented at a slight angle relative to the longitudinal axis of the brace and extending from the upper edge 84 of the brace to a position near the central longitudinal axis of the brace. Upper notch 88 also includes a horizontal abutment surface 92 extending perpendicularly from the lower end of the vertical abutment surface 90 and extending beyond an outer longitudinal edge 94 of the brace to form a horizontal lip 96. With vertical and horizontal abutment surfaces 90 and 92 abutting vertical and horizontal edges 98 and 100 of flange 68, the longitudinal axis of brace 82 is inwardly canted toward the peripheral edge of upper core grid 30. Lower notch 102 includes a vertical abutment surface 104 with a length spanning the thickness of upper core grid 30 and a tilted orientation relative to the longitudinal axis of the brace. Vertical abutment surface 104 of lower notch 102 extends at an angle relative to the longitudinal axis of the brace from the lower edge 86 of the brace to a horizontal abutment surface 106 extending from an inner longitudinal edge 108 of the brace. Lower edge 86 and upper and lower horizontal abutment surfaces 92 and 106 for brace 82 are parallel and are suitably spaced to maintain the brace 82 in a propped position between the top flange 68 and the top surface 109 of the horizontal plate 56 adjacent the inner edge 60 of the plate. Lower edge 86 of the brace abuts the top surface 109 of the horizontal plate 56 proximate the inner edge 60 of the plate while the lower horizontal abutment surface 106 abuts the peripheral edge of the upper core grid 30.

Installation of braces 82 involves lowering each brace vertically into the space between the upper core grid 30 and the upper cylindrical section 62 of the shroud. Upper and lower ends 84 and 86 of the brace are then urged in opposite directions toward upper flange 68 and upper core grid 30, respectively, to wedge the braces 82 between the underside or bottom edge of the upper flange, the top surface of the horizontal plate, and the peripheral edge of the grid. The number of braces required to be installed will vary according to the vertical forces anticipated in a particular application. Typically, however, between about 4 to about 15 braces will be needed depending on the particular boiling water reactor being repaired.

By mounting braces 82 in compression between the shroud flange 68 and the top surface 109 of the horizontal plate adjacent the inner edge 60 and/or structures such as the upper core grid 30 that are mounted atop the top surface 109 adjacent the inner edge 60, the effective loading path is shifted from the lower cylindrical section 48 upward through brace 82 and directly to the shroud flange 68, thus bypassing the potentially flexible horizontal plate 56 and increasing the stiffness of the shroud structure. Specifically, axially compressive loads normally applied through the upper cylindrical section 62 to the top surface of the horizontal plate adjacent the outer edge 66 of the plate are diverted along the longitudinal axis of the brace 82 for loading the top surface of the plate near the inner edge 60 either directly or through the upper core grid 30. Similarly, upward vertical movement of the lower cylindrical section 48 caused by differential pressures on opposite sides of core support plate 24 is resisted by the presence of brace 82 bearing against the top surface of the plate near the inner edge 60, thereby preventing upward vertical movement of the inner edge 60 relative to the outer edge 66 that could result in further cracking of the horizontal plate welds or opening of cracks in the horizontal welds beneath the lower cylindrical section 48.

The brace 82 can be made of any material suitable for bearing compressive loads in the environment of a boiling water nuclear reactor, such as the Type 304 stainless steel used for fabricating the main vertical sections of the shroud. In addition, the braces can have any cross-sectional configuration suitable for resisting buckling and providing the desired axial reinforcement such as, for example, flat bars having square or rectangular cross-sections or rods having circular cross-sections.

Figure 5:
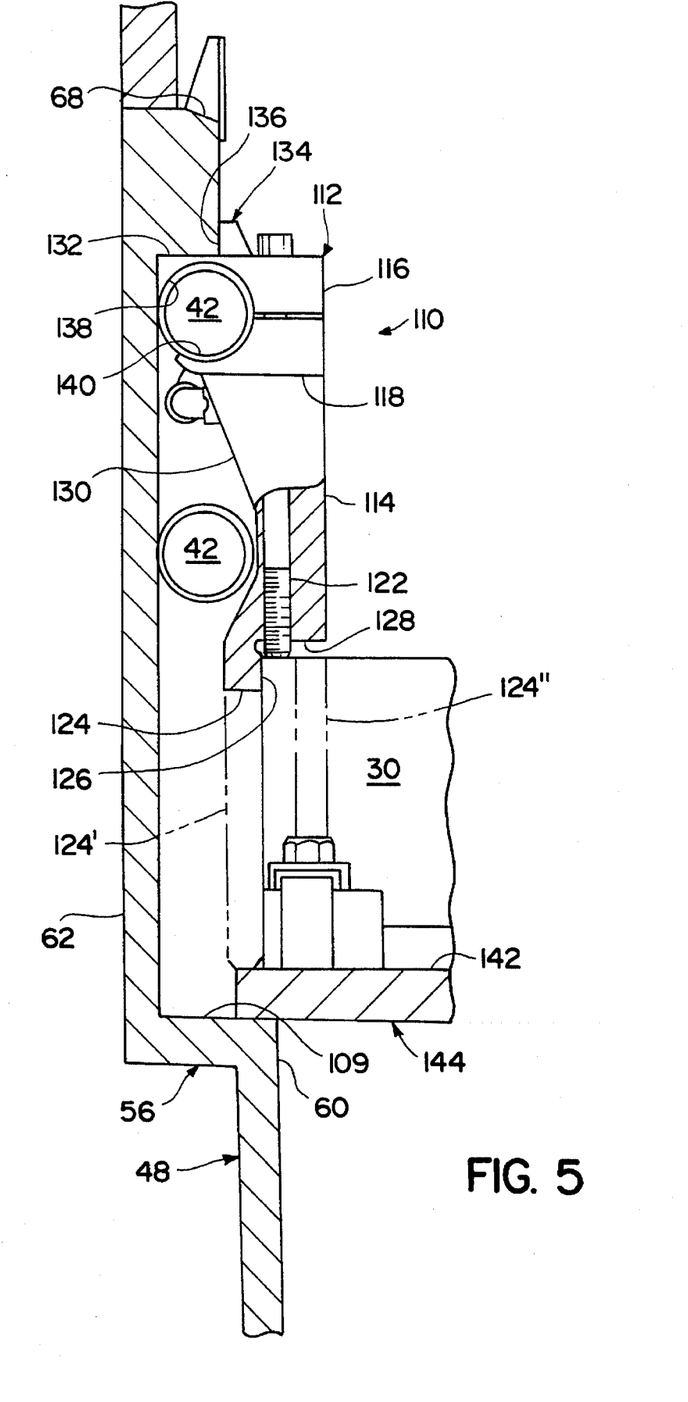
FIG. 5 is a detailed side view in broken longitudinal section of a portion of a reactor shroud repaired using a modified brace.
Figure 6:
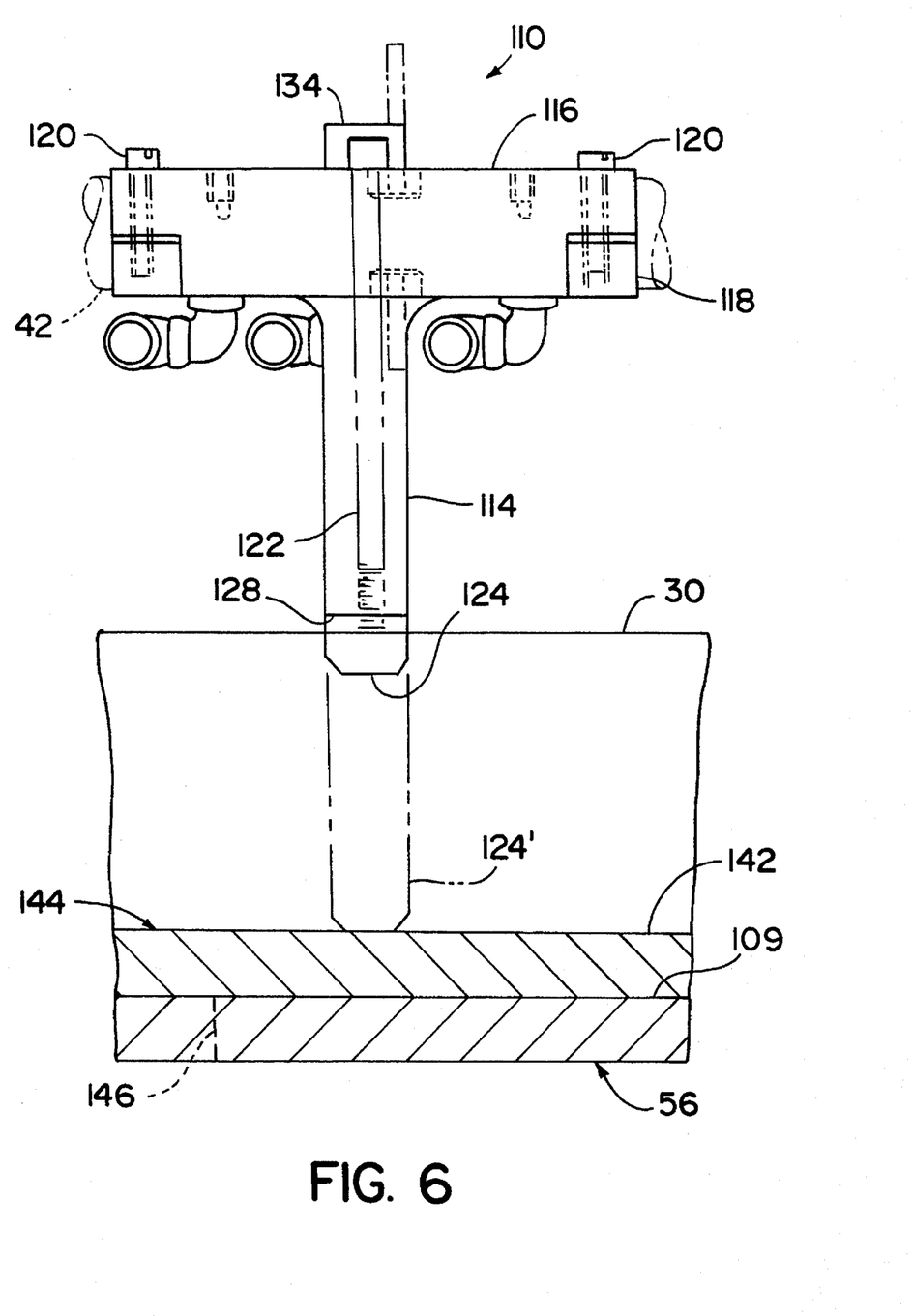
FIG. 6 is a frontal view of the modified brace of FIG. 5.

A modification of the shroud and brace assembly of the present invention is shown in FIGS. 5 and 6 wherein the modified brace 110 includes a T-shaped main body 112 having a vertical leg 114 and a cross-member 116, a movable jaw 118 suspended from the cross-member 116 with clamping screws 120, and a jacking bolt 122 extending through the cross-member and vertical leg. Vertical leg 114 depends downwardly from the middle of cross-member 116 to a bottom edge 124 that is notched to define a vertical abutment surface 126 parallel to the longitudinal axis of the leg and a horizontal abutment surface 128 perpendicular to the vertical abutment surface 126. A curved inner surface 130 of vertical leg 114 defines a trough-like recess in a transverse direction for providing clearance between the vertical leg 114 and a lower core sparger 42 running horizontally along the inside surface of the upper cylindrical section 62.

Cross-member 116 includes a horizontal upper surface 132 parallel to horizontal abutment surface 128 at the bottom end of vertical leg 114 and spaced from the horizontal abutment surface 128 a vertical distance approximating the distance between the bottom edge of shroud flange 68 and the top of upper core grid 30. A wedge-shaped stop 134 is positioned atop the cross-member horizontal surface 132 with an inner face of the stop oriented to define a vertical abutment surface 136 for engaging the upper shroud flange 68. A bottom surface of cross-member 116 defines a semi-cylindrical cavity or channel 138 extending transversely along the length of cross-member 116 and being dimensioned to fit over a portion of an upper core sparger 42.

Movable jaw 118 is suspended beneath cross-member 116 by clamp screws 120 passing through opposed transverse ends of cross-member 116 and threadedly engaging movable jaw 118. The movable jaw 118 includes an upper surface defining a semi-cylindrical cavity or channel 140 extending transversely along the length of movable jaw 118 opposite cross-member cavity 138 for engaging a lower portion of the upper core sparger 42. Jacking bolt 122 extends vertically through cross-member 116 and vertical leg 114 and is threadedly engaged near the bottom of vertical leg 114 to protrude from horizontal abutment surface 128.

The brace 110 is normally provided with jacking bolt 122 and clamp screws 120 in a loosened condition to allow positioning of the brace 110 between the shroud flange 68 and the upper core grid 30. Bottom edge 124 of vertical leg 114 is first inserted between the lower core sparger 42 and upper core grid 30 in a tilted condition and the brace 110 rotated to a vertical position where opposed semi-cylindrical cavities 138 and 140 are disposed on opposite sides of upper core sparger 42 and wedge shaped stop 134 abuts an inner vertical surface of shroud flange 68. Clamp screws 120 are then tightened to draw movable jaw 118 vertically upward against upper core sparger 42 thereby clamping the brace 110 about the upper core sparger. Jacking bolt 122 is selectively tightened against the upper core grid 30 to increase the snugness of the fit between the shroud flange 68 and the upper core grid 30 to insure efficient transmission of loads through the brace 110.

Although the brace shown in FIGS. 5 and 6 includes a bottom edge 124 extending along only part of the thickness of the upper core grid 30 to define a vertical abutment surface 126, the bottom edge 124 can also be extended vertically, as shown in phantom at 124', to abut the top surface 142 of an upper core grid plate 144 mounted on the top surface 109 of the horizontal plate 56 near the inner edge 60, particularly when the upper core grid structure 30 atop the grid plate 144 is not a structural element capable of transmitting axial loads. Alternatively or in addition to extending leg 114 toward upper core grid plate 144, bottom edge 124 can be configured to extend through openings formed in the upper core grid 30 as shown in phantom at 124" in FIG. 5. Referring to FIG. 6, a radial weld is shown in phantom at 146; and, when the method and apparatus of the present invention are used with a horizontal plate formed of multiple arcuate pieces connected by radial welds as shown, relative vertical displacement between the welded pieces making up the horizontal plate is prevented even where cracks have developed along the radial welds joining the horizontal plate pieces.

From the above, it will be appreciated that the installation of braces according to the method of the present invention serves the function of taking vertical loads off a horizontal plate adjoining upper and lower cylindrical sections of a boiling water reactor shroud and preventing deflection of the horizontal plate under various service conditions and accident loading conditions to prevent coolant flow from passing around the core region of the reactor through separations along horizontal welds of the shroud cylindrical sections. Moreover, by redirecting loads around the horizontal plate, the method and apparatus of the present invention reduces the stresses on the horizontal plate welds joining the upper and lower cylindrical sections of the shroud prior to or after the development of horizontal cracks and thus persists in preventing further cracking of these welds by greatly reducing the stresses experienced by the horizontal plate welds. The method and apparatus of the present invention can accommodate any degree of cracking associated with the welds in the horizontal plate of the shroud without depending on the stiffness and/or deflection of the horizontal plate, will reduce the tendency for growth of existing cracks of the welds directly associated with the horizontal plate of the shroud because of the increased stiffness provided, and is adequate for all existing loads including vibration and cyclic loading, main steam line brakes, and recirculation line brakes as well as seismic events. It is a permanent repair or modification that can be installed without welding or cutting or drilling into the existing shroud and is readily installable and removable without modification to the existing reactor. Additionally, the repair does not impact the emergency core spray nozzle performance within the core shroud.

Although the method and apparatus of the present invention have been described with reference to a cylindrical boiling water reactor shroud having a horizontal transition between adjacent vertical plate sections, it will be appreciated that shrouds of any cross-sectional configuration can be repaired or reinforced according to the present invention. Accordingly, the vertical shroud plate sections of the present invention can be cylindrical as shown, frusto-conical, polygonal or elliptical in cross-section or have any other geometrical configuration suitable for surrounding the reactor core and supporting various reactor components.

Additionally, the braces of the present invention can be secured at angularly spaced locations about the inner or outer peripheral surfaces of the shroud to already existing structures carried by the upper and lower vertical shroud sections or to structures installed in situ. The braces can be used alone but are particularly advantageous when used with plural tie-rods secured in vertical orientation at a plurality of angularly spaced locations about the periphery of the shroud between the upper cylindrical section 62 and shroud support 76 as shown in phantom at 148 in FIG. 3. The tie-rod shown is merely exemplary and the braces of the present invention can be used with any tie-rod suitable for being tensioned to axially compress the shroud, including those described in commonly-owned copending patent applications Ser. No. 08/190,796, filed Feb. 2, 1994, and "Method and Apparatus for Repairing Boiling Water Reactor Shrouds Utilizing Tie-Rods With Multiple Longitudinal members," filed Dec. 15, 1994, the disclosures of which are incorporated herein by reference.

Having described preferred embodiments of a new and improved method and apparatus for repairing boiling water reactor shrouds in accordance with the present invention, it is believed that other modifications, variations and changes will be suggested to persons skilled in the art in view of the teachings set for herein. It is therefor to be understood that all such variations, modifications and changes are believed to fall within the scope of the present invention as defined by the appended claims.

We claim:

1. A method of repairing a nuclear reactor core shroud having a horizontal shroud plate extending inwardly from a lower edge of an upper vertical shroud plate section to an upper edge of lower vertical shroud plate section to form a horizontal rim supporting an upper core grid structure or the like, said method comprising the step of:

(a) securing a plurality of braces in compression between sites on the interior of the upper vertical shroud plate section and the upper edge of the lower vertical shroud plate section at a respective plurality of angularly spaced locations about the interior of the shroud.

2. The method of claim 1 wherein step (a) includes the step of:

(b) inserting each brace between a flange carried by the upper shroud plate section and the upper core grid structure.

3. The method of claim 2 wherein step (b) includes the steps of:

(c) positioning a lower notched end of each brace against an outer peripheral edge of the upper core grid structure; and (d) positioning an upper notched end of each brace against a bottom edge of the flange.

4. The method of claim 3 and further comprising the step of:

(e) urging the flange away from the upper core grid structure.

5. The method of claim 4 wherein step (e) includes the step of:

(f) tightening a jacking bolt threadedly engaged in vertical orientation through the brace and having a lower end bearing against the upper core grid structure.

6. The method of claim 1 and further comprising the step of:

(g) clamping an upper end of the brace around a circumferential tubular core spray sparger.

7. The method of claim 1 and further comprising the steps of:

(h) securing a plurality of tie-rods to sites on the shroud adjacent the top and bottom of the shroud at a respective plurality of angularly spaced locations about the shroud periphery; and (i) urging the sites adjacent the top of the shroud toward the sites adjacent the bottom of the shroud along respective tie-rods.

8. A boiling water reactor shroud assembly comprising:

a boiling water reactor shroud having a horizontal shroud plate extending inwardly from a lower edge of an upper vertical shroud plate section to an upper edge of a lower vertical shroud plate section to form a horizontal rim; and a plurality of braces held in compression between sites on the interior of said upper vertical shroud plate section and the upper edge of said lower vertical shroud plate section at a respective plurality of angularly spaced locations about the interior of said shroud.

9. The boiling water reactor shroud assembly of claim 8 and further comprising an upper core grid structure resting on said horizontal rim.

10. The boiling water reactor shroud assembly of claim 9 wherein said upper vertical shroud plate section includes a transverse flange and each brace is secured between said transverse flange and said upper core grid structure.

11. The boiling water reactor shroud assembly of claim 10 wherein each brace includes a lower end having an inside notch and an upper end having an outside notch and said lower notched end of each brace is positioned against an outer peripheral edge of said upper core grid structure and said upper notched end of each brace is positioned against said transverse flange.

12. The boiling water reactor shroud assembly of claim 11 and further comprising a circumferential tubular core spray sparger disposed within said upper vertical shroud plate section, wherein each brace includes a clamp configured to clamp an upper end of said brace around said circumferential tubular core spray sparger.

13. The boiling water reactor shroud assembly of claim 12 wherein said clamp includes a pair of opposed jaws joined by clamp screws and defining an arcuate surface for receiving the tubular core spray sparger.

14. The boiling water reactor shroud assembly of claim 10 wherein each brace includes a jacking assembly operable to urge said transverse flange away from said upper core grid structure.

15. The boiling water reactor shroud assembly of claim 14 wherein said jacking assembly includes a jacking bolt threadedly engaged in vertical orientation through said brace and having a lower end bearing against said upper core grid structure.

16. The boiling water reactor shroud assembly of claim 8 and further comprising a plurality of tie-rods attached to sites on said shroud adjacent top and bottom portions of the shroud at a respective plurality of angularly spaced locations about a periphery of said shroud.

* * * * *